(12) United States Patent
Gruenbauer et al.

(10) Patent No.: US 6,527,825 B1
(45) Date of Patent: Mar. 4, 2003

(54) PROCESS FOR PREPARING NANOSIZE METAL OXIDE POWDERS

(75) Inventors: Henri J. M. Gruenbauer, HC Oostburg (NL); Jacobus A. F. Broos, Terneuzen (NL); Ronald van Voorst, Vogelwarde (NL)

(73) Assignee: Dow Global Technologies Inc., Midland, MI (US)

( * ) Notice: Subject to any disclaimer, the term of this patent is extended or adjusted under 35 U.S.C. 154(b) by 0 days.

(21) Appl. No.: 09/762,128

(22) PCT Filed: Aug. 17, 1999

(86) PCT No.: PCT/US99/18809

§ 371 (c)(1),
(2), (4) Date: Mar. 28, 2001

(87) PCT Pub. No.: WO00/10913

PCT Pub. Date: Mar. 2, 2000

Related U.S. Application Data

(60) Provisional application No. 60/097,119, filed on Aug. 19, 1998.

(51) Int. Cl.[7] .............................. B22F 9/24; C01B 13/18
(52) U.S. Cl. .............................. 75/362; 264/5; 423/592; 423/598; 423/600; 423/608; 423/612; 423/628
(58) Field of Search .............................. 75/362; 264/5; 423/592, 598, 600, 608, 612, 628

(56) References Cited

U.S. PATENT DOCUMENTS

| | | | |
|---|---|---|---|
| 4,367,259 A | 1/1983 | Fulmer et al. | 428/240 |
| 4,929,433 A | 5/1990 | Hexemer, Jr. et al. | 423/411 |
| 5,102,639 A | 4/1992 | Chou et al. | 423/263 |
| 5,240,493 A | 8/1993 | Zhen et al. | 75/362 |
| 5,338,334 A | 8/1994 | Zhen et al. | 75/362 |
| 5,698,483 A | 12/1997 | Ong et al. | 501/12 |
| 5,837,025 A * | 11/1998 | Auchter-Krummel et al. | 423/266 |
| 5,874,374 A | 2/1999 | Ong | 501/12 |
| 5,998,523 A * | 12/1999 | Grunbauer et al. | 524/403 |

FOREIGN PATENT DOCUMENTS

| | | |
|---|---|---|
| EP | 0 404 385 A1 | 12/1990 |
| WO | 98/51617 | 11/1998 |
| WO | 99/03627 | 1/1999 |

* cited by examiner

*Primary Examiner*—George Wyszomierski

(57) ABSTRACT

Disclosed is a process for preparing nanoscale metal-based powders from a metal salt and an amphiphilic copolymer containing ethylene oxide. The copolymer and metal salt are mixed to form a metal salt/copolymer paste which is then calcined at a temperature sufficient to remove water and organics and to form a metal oxide.

18 Claims, No Drawings

PROCESS FOR PREPARING NANOSIZE METAL OXIDE POWDERS

This application claims the benefit of Provisional application No. 60/097,119 filed Aug. 19, 1998.

This invention relates to a process for producing nanoscale metals or metal based powders. In particular, this invention relates to a process for preparing nanoscale powders from a metal salt solution and an amphiphilic material.

Metal or metal oxide particles of nanoscale and submicron size are a valuable industrial commodity finding use in many applications, including the manufacture of industrial catalysts such as might be employed in the chemical industry, in the manufacture of ceramics, of electronic components, coatings, manufacture of catalysts, capacitors, mechanical-chemical polishing slurries, magnetic tapes and as fillers, for example, for plastics, paints or cosmetics.

A large variety of techniques are available for the manufacture of metal or metal oxide powders having a very fine particle size. Such techniques include solution processes and high temperature gas phase and condensed phase synthesis. For a comprehensive review of the general techniques available for producing nanosize particles, see for example, "Chemical Engineering Aspects of Advanced Ceramic materials" by V. Hlavacek and J. A. Puszynski published in the Journal of Industrial Engineering and Chemical Research, pages 349–377, Volume 35, 1996. A general overview of sol-gel processing is given in Controlled Particle, Droplet and Bubble Formation, edited by David J. Wedlock, Butterworth-Heinemann Ltd., 1994, pages 1–38.

Despite the numerous procedures available, nanoscale powders are generally expensive and difficult to prepare in large quantities, thus limiting their applications, for example, to high technology ceramics.

A simplified procedure for producing nanometer size particles is described in U.S. Pat. No. 5,240,493. The described process requires the calcination of a polyurethane foam containing a metal cation. In a related procedure U.S. Pat. 5,698,483 describes mixing an aqueous continuous phase containing a metal salt with a hydrophilic organic polymer, forming a gel, and then heat treating the gel to drive off water and organics, leaving as a residue a nanoscale powder. The yield of metal oxide produced from the polymer solution by the disclosed method is very low and is improved by using an intermediate drying step.

It would therefore be desirable to develop a cost effective procedure leading to the production of metal or metal oxide powders having a consistently fine particle size. It is also desirable to have a procedure that could be operated using a high level of metal in proportion to a polymer. It would also be advantageous if such a procedure were able to provide for the production of metal powders in a high yield.

The present invention is a process for preparing nanoscale metal or metal-based powder by calcining at a temperature sufficient to drive off organics from a composition that comprises (a) a solution containing at least one metal salt (b) an amphiphilic ethylene oxide-containing copolymer wherein the copolymer has an average molecular weight of greater than 400, an ethylene oxide content of 1 to 90 percent and an hydrophilic-lipophilic balance (HLB) of between −15 and 15 and (c) optionally a coagulating agent, with the proviso that when aluminum is the sole metal, a coagulating agent is present.

The process produces metal-based powders of high purity and uniform size. The paste formed in the present process by the mixing of the metal salt and copolymer contains a high concentration of metal as compared to other known processes. The formation of a paste with a high metal concentration is advantageous as this reduces the amount of water that needs to be removed from the paste prior to or during calcination and decreases cost versus existing technologies.

In accordance with the process of the present invention, it has been unexpectedly found that by mixing at least one metal salt with an amphiphilic copolymer containing ethylene oxide, higher concentrations of metal salt and higher salt to copolymer ratios can be used as compared to similar known processes using hydrophilic polymers. The use of a high salt to copolymer ratio minimizes the decrease in activity of the salt solution upon addition of the copolymer. Activity is defined in the present context as grams of metal oxide obtained after calcination of 100 grams of metal salt solution or metal salt/copolymer paste. Additionally, the present process gives a substantial increase in the surface area of the nanoscale size particles compared to the surface area of particles prepared in the absence of the copolymer. Nanoscale particle means the primary particle or crystalline size is about 200 nanometers or less, preferably in the range of from 5 to 100 nanometers.

Mixing a copolymer with a metal salt according to the present invention produces a metal salt/copolymer paste. The term "paste" as used herein means a soft, smooth solid or semisolid. When the copolymer is added to the metal solution, a paste is formed.

The copolymers suitable for use in the present invention are amphiphilic copolymers containing ethylene oxide wherein the ethylene oxide content is between 1 and 90 percent. The percent ethylene oxide is the weight percent of ethylene oxide units in the total weight of the copolymer. Preferably the ethylene oxide content is greater than about 5 percent of the copolymer. More preferred are copolymers where the ethylene oxide content is about 8 percent or greater. Most preferred are copolymers where the ethylene oxide content is about 10 percent or greater. Preferably the ethylene oxide is less than about 80 percent of the copolymer. More preferred are copolymers where the ethylene oxide content is less than about 75 percent. In a preferred embodiment of the present process, the copolymers are block copolymers containing ethylene oxide.

The term amphiphilic as used herein means a compound which has a HLB between −15 and 15 as calculated per Davis, Proc. Intern. Congr. Surface Activity, Vol. 1 London 1957, p. 426. The procedure assigns numeric values to various groups, for example, hydrophilic groups $—SO_4^-Na^+$, $—COO^-K^+$, and $—COOH$ are assigned values of +38.7, +21.1 and +2.1 respectively; the hydrophobic groups $>CH—$, $—CH_2—$, and $—CH_3$ are all assigned a value of −0.475. For a given structure, the HLB number is calculated by substituting the group numbers into the following equation:

$$HLB = \Sigma(\text{hydrophilic group numbers}) + \Sigma(\text{lipophilic group numbers}) + 7.$$

Preferably the copolymers used in the present process have an HLB of greater than −10 and preferably less than 13. More preferred are copolymers having an HLB balance of −5 to 10.

Hydrophilic compounds as defined by the above HLB, show a tendency to be fully miscible with water in all proportions under ambient conditions, or in the case of solid materials, at some elevated temperature slightly above their melting point, (for example, about 60° C. for high molecular weight linear polyethylene oxide polymers). In contrast, lipophilic compounds show a tendency to be totally immiscible with water, even at elevated temperatures. The range of HLB values for copolymers of the present invention represent an intermediate case comprising materials which form liquid two-phase systems upon mixing with water (or for solids, after mild heating) such that at least one of the two phases contains more than trace amounts of the opposing phase. For the purpose of the present invention, this intermediate class is designated as amphiphilic, in contrast with hydrophilic and lipophilic classes representing, respectively the upper and lower segment of the HLB value range. In summary, as used herein an HLB>15 represents hydrophilic compounds; an HLB of −15 to 15 represents amphiphilic compounds; and an HLB of<−15 represents lipophilic compounds.

In addition to the ethylene oxide content of the copolymer, to obtain the desired yield of metal oxide, the copolymers for use in the present invention have an average molecular weight of greater than 400. Preferably the copolymers have an average molecular weight of greater than 500. More preferred are copolymers which have an average molecular weight of greater than 750. Most preferred are copolymers which have an average molecular weight of greater than 1000. Generally the average molecular weight of the copolymer is less than about 100,000. Preferably the average molecular weight of the copolymer is less than 80,000. More preferred are copolymers with an average molecular weight of less than 50,000.

Ethylene oxide copolymers having the percent ethylene oxide content and average molecular weight as described herein can be produced by standard procedures in the art for producing ethylene oxide copolymers.

As used herein, the term "metal" refers to metallic or metalloid elements as defined in the Periodic Table of Elements selected from Groups 2a, 3a, 4a, 5a, 6a; 2b, 3b, 4b, 5b, 6b, 7b, 8, 1b and 2b; the lanthanide elements; and the actinide elements. The metal can in principle be of any element from which it is desired to obtain a powder, however those presently having greatest industrial value and suitable for use in the present invention include lanthanum, barium, strontium, chromium, zirconium, yttrium, aluminum, lithium, iron, antimony, bismuth, lead, calcium, magnesium, copper, boron, cadmium, cesium, cerium dysprosium, erbium, europium, gold, hafnium, holmium, lutetium, mercury, molybdenum, niobium, osmium, palladium, platinum, praseodymium, rhenium, rhodium, rubidium, ruthenium, samarium, scandium, sodium, tantalum, thorium, thulium, tin, zinc, nickel, titanium, tungsten, uranium, vanadium, ytterbium, manganese, cobalt, gadolinium or a mixture of two or more thereof.

When using the metal salt, aluminum nitrate, to obtain nanoscale particles having an increased surface area over the metal salt alone, it has been observed that the aluminum needs to be used in combination with a coagulating agent as disclosed herein.

The metals used can vary based on the application. For example, for electric applications, such as electrical capacitors, the metals Bi, Ba, Cu, La, Mg, Nb, Sn, Ti, Zr or a mixture thereof are preferred. For use in auto catalysts, Al, Ce, La, Mg, Nb, Y, Zr or a mixture thereof are preferred.

The metals are generally used in the form of a salt which is dissolved in a solvent system such as water, alcohol, acetone, tetrahydrofuran, dimethylformamide or other solvent system selected according to its ability to dissolve the metal salts and for its compatibility with the copolymer. Preferably the solvent is water. The concentration of metal salt present in the solvent is as high as practically possible in consideration of its solubility limit. Where possible it is preferred to use aqueous compositions which are essentially saturated solutions at ambient temperature. The activity of the salt solution will depend on the solubility of the metal salt and the ratio of molecular weight of the metal or metal based compound to molecular weight of the metal salt. For metal salts which are readily soluble in water, such as nitrates, the metal solution generally has an activity of greater than 5 percent. Preferably, such solutions have an activity of 7 percent or greater. More preferred are solutions with an activity of 10 percent or greater. Most preferred are solutions with an activity of 15 percent or greater. Generally, the metal salt solution of commercial interest has an activity of less than 50 percent.

The amount of copolymer added to the metal salt is generally an amount which does not decrease the activity of the starting salt solution by more than 50 percent (grams oxide obtained after calcination from a metal salt solution compared to the grams oxide obtained after calcination from a metal salt/copolymer mixture). Preferably the amount of copolymer added to the metal salt results in less than a 45 percent decrease in activity. More preferably, the amount of copolymer added to the metal salt results in less than 40 percent decrease in activity. Most preferred is a metal salt to polymer ratio such that the decrease in activity is 30 percent or less.

Although not preferred a coagulating agent can be added to the metal salt/amphiphilic copolymer. Such coagulating agents are disclosed in WO 99/03629 published Jan. 28, 1999. In general the coagulating agent is any substance which is able to induce coagulation, that is, induce a change from a fluid state to a solid or semi-solid state, that is, paste.

In addition to aiding in the formation of a paste, it is observed that with some metals the addition of a coagulating agent plus copolymer will increase the surface area of the nanoscale particles over that observed with the copolymer alone, for example, titanium and zirconium. For some metal salts, such as cerium, the addition of a coagulating agent will decrease the surface area of the nanoscale particles when compared to the use of a copolymer alone. A determination of whether the coagulating agent will enhance the surface area over that obtained with the use of a copolymer alone can be determined based upon the teachings herein.

The addition of a coagulating agent and any water or carrier solvent with the coagulating agent will obviously decrease the activity.

The coagulating agent can be an organic or inorganic substance. Advantageously the substance should not leave any residue after pyrolysis/calcining. When the coagulating agent is an organic substance, suitable are primary- or secondary-, amines, amides or alkanolamines. Particularly suitable are, for example, monoethanolamine, diethanolamine. When the coagulating agent is an inorganic substance suitable basic substances include for example, ammonium hydroxide, ammonium hydrogen carbonate, ammonium carbonate. Examples of inorganic, acidic, coagulating agents include hydrogen sulfide. Examples of organic coagulating agents include citric acid, ethylene diaminetetraacetic acid and other carboxylic compounds.

When used, preferably the coagulating agent is a hydroxide such as an ammonium solution or an alkaline hydroxide solution, such as sodium or potassium. Ammonium hydroxide is preferred due to its high basicity, attractive water solubility leading to a rapid coagulation result, and absence of an additional metal. Ammonium hydroxide will also be volatilized upon heating. Ammonium hydroxide may be introduced as an aqueous solution, bubbling of $NH_4$ gas, or alternatively generated in situ by use of a precursor.

Examples of precursors include ammonia gas and urea. Urea on exposure to thermal energy undergoes decomposition leading to generation of nascent ammonia, which in the aqueous environment provides for immediate formation of ammonium hydroxide. Formation of ammonium hydroxide by way of urea, provides for an extremely effective distribution of the coagulating agent through-out the composition and in any instances superior to that which can be achieved by direct introduction and mechanical mixing.

The amount of coagulating agent to add is preferably at least the amount required to coagulate out the metal under consideration.

A process of the present invention results in metal-based powders which have an increase in surface area over powders produced in the absence of the copolymer. Generally when selecting conditions as disclosed herein, the increase in surface area is greater than 30 percent. Preferably the amount of copolymer added to the metal salt gives a powder having a greater than 50 percent increase in the surface area. More preferably the copolymer to metal salt is selected to give a powder with a 75 percent increase in the surface area.

Any equipment commonly used in blending viscous liquids can be employed to produce the composition of this invention. Such equipment provides for the efficient mixing, under high shear conditions, of controlled amounts of aqueous base solution with the aqueous composition comprising both the metal salt and the copolymeric composition. It is presently believed that high shear during mixing is desired so that a fine dispersion of the salt in the paste is obtained. In contrast, it is believed that low shear rates during mixing provide an undesired opportunity for growth of metal salt crystals during the process. Preferred are methods capable of mixing components effectively, such as techniques disclosed in U.S. Pat. No. 5,688,842.

The disclosed composition when calcined under controlled conditions, providing for the removal of all organic substance, results in the formation of a substantially uniformly sized, metal-containing powder. Typically the calcining conditions require exposing the composition to a temperature of from 300° C. to 3000° C., and preferably from 400° C. to 1000° C. for a period of a few minutes to many hours. Optionally, the formed metal salt/copolymer paste can be dried prior to calcination. Drying of the formed paste prior to calcination can increase the surface area of the nanoscale particles, particularly when a coagulating agent is used.

The described metal-containing powders having a nanoscale size are of value in the manufacture of ceramic articles, industrial catalysts, electronic components, and as fillers for plastics, paints or cosmetics. When used as filler the metal-containing powder will be present, based on the total weight of bulk matrix and powder, typically in an amount of from 0.1 to 50, and more usually in an amount of from 1 to 25 weight percent. The bulk matrix may be for example, a plastic, including a thermoset or thermoplastic polymer, a paint, or a cosmetic composition, cream or oil. The nanoscale particles can also be used in chemical-mechanical polishing as disclosed in U.S. Pat. No. 4,057,939.

The invention is particularly useful for providing catalysts upon catalyst supports such as those used for reducing exhaust emissions. For example, the composition prior to calcining may be first deposited on at least a portion of a surface of a catalyst support suitable for exhaust emission control (for example, metal, ceramic or combinations thereof). Preferably, the catalyst substrate is a ceramic selected from cordierite, mullite and combinations thereof. More preferably, the substrate is cordierite, acicular mullite or combinations thereof.

The invention is illustrated by way of the following Examples. Unless otherwise indicated all amounts are expressed as parts by weight.

EXAMPLES 1–9

A series of cerium nitrate ($Ce(NO_3)_3 \cdot 6H_2O$) solutions were prepared by adding 0.5, 1, 2, and 3 kg of cerium nitrate to a liter of water. This represents a calculated activity of 13.2, 19.8, 26.4 and 29.7 respectively. To 80 parts of the various salts solutions was added 20 parts by weight of a copolymer as listed in Table I which gives the initiator name and formula, molecular weight, percent ethylene oxide, propylene oxide and/or butylene content and HLB of the copolymers. The addition of 20 parts by weight of copolymer to the 0.5, 1, 2, and 3 kg plus 1 liter water solutions gives a calculated activity for the starting metal salt/copolymer mix of 10.6, 15.9, 21.1 and 23.8, respectively. Copolymers A–I are examples of the present invention and copolymers J–Q are shown for comparative purposes.

TABLE 1

Description of copolymers

| Copolymer | MW | Initiator fragments | % EO | % PO | % BO | HLB |
|---|---|---|---|---|---|---|
| A* | 458.5 | $CH_3$ + 11.6 $CH_2$ + O (nominally a $C_{12.6}$ fatty alcohol) | 57.6 | 0.0 | 0.0 | 4.3 |
| B* | 502.5 | $CH_3$ + 11 + 6 $CH_2$ + O (nominally a $C_{12.6}$ fatty alcohol) | 61.3 | 0.0 | 0.0 | 4.6 |
| C* | 704 | $CH_3$ + 15 $CH2$ + O (nominally a $C_{16}$ fatty alcohol) | 37.5 | 33.0 | 0.0 | 2.1 |
| D* | 1563 | $CH_3$ + 12 $CH_2$ + O (nominally a $C_{13}$ linear alcohol) | 46.4 | 40.8 | 0.0 | 5.9 |
| E | 1691 | $CH_3$ + O (methanol) | 33.8 | 0.0 | 64.3 | 2.7 |
| F | 2152 | $CH_3$ + O (methanol) | 67.1 | 0.0 | 31.4 | 12.8 |
| G | 4090 | $CH_3$ + O (methanol) | 54.6 | 0.0 | 44.6 | 8.7 |
| H* | 5000 | 2 $CH_2$ + 3 O + CH (glycerol) | 12.0 | 86.2 | 0.0 | 0.2 |
| I* | 11148 | 2 $CH_2$ + 6 O + 4 CH (sorbitol) | 14.8 | 83.6 | 0.0 | 0.2 |
| J*[a] | 400 | 2 $CH_2$ + 2 $CH_3$ + 2 CH + 3 O (dipropylene glycol) | 0.0 | 100.0 | 0.0 | 6.0 |
| K*[a] | 400 | 4 $CH_2$ + 3 O (diethylene glycol) | 100.0 | 0.0 | 0.0 | 10.0 |
| L*[a] | 974 | 2 $CH_2$ + 6 O + 4 CH (sorbitol) | 81.3 | 0.0 | 0.0 | 17.9 |
| M*[a] | 4000 | 2 $CH_2$ + 2 $CH_3$ + 2 CH + 3 O (dipropylene glycol) | 0.0 | 100.0 | 0.0 | −3.3 |

TABLE 1-continued

Description of copolymers

| Copolymer | MW | Initiator fragments | % EO | % PO | % BO | HLB |
|---|---|---|---|---|---|---|
| N*a | 5000 | 2 CH$_2$ + 3 O + CH (glycerol) | 74.0 | 24.2 | 0.0 | 31.5 |
| O$^a$ | 8000 | 2 CH$_2$ + 6 O + 4 CH (sorbitol) | 90.0 | 7.7 | 0.0 | 64.4 |
| P*a | 8000 | 4 CH$_2$ + 3 O (diethylene glycol) | 100.0 | 0.0 | 0.0 | 67.0 |
| Q$^a$ | 10000 | 4 CH$_2$ + 3 O (diethylene glycol) | 80.0 | 0.0 | 0.0 | 61.8 |

*Commercially available from The Dow Chemical Company
$^a$Not an example of this invention After addition of a copolymer to the metal salt, the mixture was quickly mixed using a rotary mixer (Servis Heidolph Model RGL 500). Formation of a paste occurs within thirty seconds. The obtained pastes were then calcined at 500° C. for two hours to burn off the organic material (temperature increase of 25° C./minute until calcination temperature reached). The surface area of the resulting powders was measured by BET N$_2$ absorption technology using a Pulse Chemisorb Model 2700 from Micromeritics Instrument Corporation. The yield and surface area of the powders obtained at the various levels of metal salt concentration are given in Table II. The surface area of particles obtained without the addition of any polymer was 54, 62, 65 and 65 m$^2$/g of starting solutions of 0.5, 1, 2 and 3 kg metal salt plus 1 liter water (labeled I, II, III and IV in Table II) respectively. The results show a substantial increase in the surface area of nanoscale particles produced using amphiphilic copolymers as compared to the absence of a copolymer or as compared to the use of a hydrophilic or lipophilic copolymer.

surface area and activity of the formed metal powders with and without the addition of NH$_4$OH as a coagulating agent are given in Table III. The ammonium hydroxide was added after the addition of the copolymer.

TABLE III

Nanoscale particles from titanium chloride

| Sample | 9C* | 10C* | 10 | 11 | 12 | 13 |
|---|---|---|---|---|---|---|
| Pbw TiCl$_4$ Solution | 50 | 50 | 30 | 30 | 40 | 40 |
| Pbw Copolymer D | 0 | 0 | 20 | 20 | 10 | 10 |
| Pbw NH$_4$OH (25%) | 0 | 40 | 0 | 30 | 0 | 40 |
| Surface Area (m$^2$/g) | 41 | 58 | 71 | 84 | 59 | 73 |
| Activity (g oxide/100 g resin) | 27 | 16.7 | 16.1 | 10.6 | 22.4 | 12.6 |

*Not examples of the present invention

EXAMPLES 14–17

A mixed metal solution of zirconium and cerium was prepared by mixing 100 is grams of Zirconia Sol obtained

TABLE II

Results in terms of surface area (S.A.) and activity, activity defined as grams oxide/100 grams starting copolymer gel

| Example | Co-polymer | Activity from I | S.A. from I | Activity from II | S.A. from II | Activity from III | S.A. from III | Activity from IV | S.A. from IV |
|---|---|---|---|---|---|---|---|---|---|
| 1 | A* | 12.8 | 160 | 17.0 | 150 | 24.0 | 97 | 24.3 | 51 |
| 2 | B* | 12.5 | 175 | 18.4 | 159 | 23.2 | 97 | 23.5 | 60 |
| 3 | C* | 12.7 | 115 | 18.1 | 121 | 23.2 | 74 | 26.6 | 68 |
| 4 | D* | 11.6 | 169 | 17.1 | 156 | 22.8 | 150 | 25.8 | 155 |
| 5 | E | 11.9 | 143 | 17.3 | 133 | 23.6 | 140 | 26.5 | 146 |
| 6 | F | 11.7 | 143 | 17.1 | 118 | 22.7 | 121 | 25.9 | 153 |
| 7 | G | 11.2 | 137 | 16.8 | 110 | 22.0 | 74 | 24.8 | 21 |
| 8 | H* | 12.1 | 132 | 17.9 | 117 | 22.3 | 101 | 25.3 | 102 |
| 9 | I* | 12.9 | 159 | 18.3 | 129 | 23.4 | 110 | 26.9 | 123 |
| 1C | J*a | 14.1 | 116 | 17.1 | 56 | 16.1 | 15 | 16.0 | 14 |
| 2C | K*a | 14.2 | 105 | 16.1 | 78 | 21.4 | 75 | 21.5 | 47 |
| 3C | L*a | 11.4 | 137 | 16.3 | 24 | 20.6 | 3 | 23.9 | 4 |
| 4C | M*a | 12.1 | 103 | 20.6 | 84 | 23.8 | 81 | 23.1 | 44 |
| 5c | N*a | 12.9 | 78 | 17.3 | 61 | 17.5 | 37 | 20.0 | 42 |
| 6C | O$^a$ | 14.5 | 80 | 17.7 | 60 | 14.9 | 31 | 9.9 | 28 |
| 7c | P*a | 13.0 | 84 | 17.5 | 72 | 20.1 | 33 | 15.2 | 31 |
| 8C | Q$^a$ | 14.2 | 75 | 17.0 | 56 | 21.5 | 30 | 18.5 | 17 |

*Commercially available from The Dow Chemical Company
$^a$Not an example of this invention

EXAMPLES 10–13

A 27 percent active solution of titanium chloride in water was made by slowly blending 64.4 parts of TiCl$_4$ with 35.6 parts of water (by weight). Pastes were prepared by mixing, under vigorous stirring, predetermined amounts of the TiCl$_4$ solution with copolymer D at varying solution/copolymer ratios as indicated by Table III (Pbw=parts by weight). The obtained pastes were calcined at 500° C. for two hours. The from Magnesium Electronic Limited and 18.3 grams of Cerium(III) nitrate.6H$_2$O. This mixture of Zr/Ce gives, upon calcination, approximately an 80/20 percent by weight ZrO/CeO$_2$. Gels were prepared by mixing, under vigorous stirring, different amounts of the metal solution, copolymer D, and NH$_4$OH as coagulating agent as given in Table IV. Ammonium hydroxide was added after the addition of the copolymer. The obtained gels were calcined at 500° C. for two hours. The surface area and activity of the formed metal powders is given in Table IV.

TABLE IV

Nanoscale powders obtained using Zirconium/Cerium

| Sample | 11C* | 12C* | 14 | 15 | 13C* | 14C* | 16 | 17 |
|---|---|---|---|---|---|---|---|---|
| PBW metal solution | 25 | 25 | 25 | 25 | 40 | 40 | 40 | 40 |
| PBW copolymer D | 0 | 0 | 15 | 15 | 0 | 0 | 10 | 10 |
| PBW NH4OH 25% | 0 | 10 | 0 | 10 | 0 | 5 | 0 | 5 |
| Surface area (m²/g) | 10 | 54 | 87 | 92 | 11 | 30 | 76 | 88 |
| Activity | 1.69 | 3.08 | 2.63 | 1.6 | 2.61 | 2.45 | 3.11 | 1.53 |

*Examples are not part of the present invention

EXAMPLES 18–37

A solution of cerium acetate was prepared by mixing 20 grams of cerium acetate.$H_2O$ to 100 grams of water. Pastes were prepared by mixing, under vigorous stirring, different amounts of the metal solution, copolymer D, and $NH_4OH$ as coagulating agent as given in Table V. The ammonium hydroxide was added after the addition of the copolymer. The obtained pastes were calcined at 500° C. for two hours. The surface area and activity of the formed metal powders is given in Table V.

TABLE V

Nanoscale powders obtained using cerium acetate

| Sample | 18 | 19 | 20 | 21 | 22 | 23 | 24 | 25 | 26 | 27 |
|---|---|---|---|---|---|---|---|---|---|---|
| PBW metal solution | 7.59 | 7.59 | 16.00 | 16.00 | 40.02 | 40.02 | 40.00 | 40.00 | 9.02 | 9.02 |
| PBW copolymer D | 9.40 | 9.40 | 9.90 | 9.90 | 16.51 | 16.51 | 14.25 | 14.25 | 22.32 | 22.32 |
| PBW extra water | 26.75 | 26.75 | 16.75 | 16.75 | 8.87 | 8.87 | 0.00 | 0.00 | 20.60 | 20.60 |
| PBW NH4OH 25% | 3.25 | 0.00 | 6.86 | 0.00 | 17.15 | 0.00 | 17.00 | 0.00 | 3.86 | 0.00 |
| Surface area (m²/g) 500° C. calcination | 95 | 111 | 98 | 121 | 115 | 123 | 121 | 130 | 109 | 107 |
| Activity | 1.4 | 1.3 | 2.8 | 2.9 | 1.5 | 3.9 | 4.3 | 5.1 | 0.7 | 1.6 |

| Sample | 28 | 29 | 30 | 31 | 32 | 33 | 34 | 35 | 36 | 37 |
|---|---|---|---|---|---|---|---|---|---|---|
| PBW metal solution | 15.00 | 15.00 | 25.35 | 25.35 | 11.38 | 11.38 | 19.51 | 19.51 | 10.54 | 10.54 |
| PBW copolymer D | 18.57 | 18.57 | 24.14 | 24.14 | 42.26 | 42.26 | 41.81 | 41.81 | 60.20 | 60.20 |
| PBW extra water | 6.42 | 6.42 | 0.00 | 0.00 | 11.92 | 11.92 | 0.00 | 0.00 | 0.00 | 0.00 |
| PBW NH₄OH 25% | 6.42 | 0.00 | 10.86 | 0.00 | 4.88 | 0.00 | 8.36 | 0.00 | 4.52 | 0.00 |
| Surface area (m²/g) 500° C. calcination | 124 | 123 | 128 | 128 | 113 | 113 | 111 | 125 | 98 | 123 |
| Activity | 0.9 | 3.3 | 1.4 | 3.7 | 1.2 | 1.5 | 1.9 | 2.7 | 1.1 | 1.3 |

EXAMPLES 38–57

The procedure used for Examples 18–37 was repeated for Examples 38–57 with the exception that the calcination temperature was 400° C. for 2 hours. The surface area nanoscale particles are as follow:

| Example | Surface area (m²/g) | Example | Surface area (m²/g) |
|---|---|---|---|
| 38 | 125 | 48 | 109 |
| 39 | 87 | 49 | 108 |
| 40 | 113 | 50 | 123 |
| 41 | 105 | 51 | 136 |
| 42 | 126 | 52 | 114 |
| 43 | 124 | 53 | 117 |
| 44 | 110 | 54 | 117 |
| 45 | 129 | 55 | 125 |
| 46 | 111 | 56 | 106 |
| 47 | 91 | 57 | 106 |

Other embodiments of the invention will be apparent to those skilled in the art from a consideration of this specification or practice of the invention disclosed herein.

What is claimed is:

1. A process for preparing nanoscale metal or metal-based powder comprising the steps of
   (1) forming a composition consisting essentially of (a) a solution containing at least one metal salt and (b) an amphiphilic ethylene oxide-containing copolymer wherein the copolymer has an average molecular weight of greater than 400, an ethylene oxide content of 1 to 90 percent and an HLB of between −15 and 15 by mixing (a) and (b) and
   (2) calcining the composition of step 1 at a temperature sufficient to drive off organics from the composition, with the proviso that aluminum is not the sole metal.

2. The process of claim 1 wherein the copolymer has an ethylene oxide content of 5 to 80 percent.

3. The process of claim 2 wherein the copolymer has an average molecular weight between 500 and 100,000.

4. The process of claim 3 wherein the copolymer has an average molecular weight between 750 and 80,000.

5. The process of claim 2 wherein the copolymer has an ethylene oxide content 8 to 75 percent.

6. The process of claim 5 wherein the copolymer has an ethylene oxide content of 10 to 75 percent.

7. The process of claim 1 wherein the copolymer has an HLB of −10 to 13.

8. The process of claim 7 wherein the metal salt is a salt of one or more metals selected from the group consisting of metals listed in the Periodic Table of Elements in Groups 2a to 6a, Groups 1b to 7b, Group 8, lanthanides and actinides.

9. The process of claim 1 wherein the metal salt is a salt of one or more metals selected from the group consisting of lanthanum, barium, strontium, chromium, zirconium, yttrium, aluminum, lithium, iron, antimony, bismuth, lead, calcium, magnesium, copper, boron, cadmium, cesium, cerium, dysprosium, erbium, europium, gold, hafnium, holmium, neodymium, lutetium, mercury, molybdenum, niobium, osmium, palladium, platinum, praseodymium, rhenium, rhodium, rubidium, ruthenium, samarium, scandium, sodium, tantalum, thorium, thulium, tin, zinc, nickel, titanium, tungsten, uranium, vanadium, and ytterbium.

10. The process of claim 9 wherein the metal is zirconium, yttrium, cerium, lanthanum, niobium, magnesium, aluminum or a mixture thereof.

11. The process of claim 1 wherein the temperature for calcining the composition is from 300° C. to 1000° C.

12. The process of claim 1 wherein the metal salt solution is an aqueous salt solution.

13. The process of claim 1 wherein the composition further contains a coagulating agent.

14. The process of claim 13 wherein the coagulating agent comprises ammonium hydroxide or an alkanolamine.

15. The process of claim 1 further comprising depositing the composition, prior to calcining, on to at least a portion of a surface of a catalyst substrate.

16. The process of claim 15 wherein the catalyst substrate is comprised of a metal, ceramic, or combination thereof.

17. The process of claim 16 wherein the catalyst substrate is a ceramic selected from cordierite, mullite and combination thereof.

18. The process of claim 1 wherein the copolymer has an HLB from 0 to 13.

* * * * *